May 31, 1966   R. M. SEDDON ETAL   3,253,818
MIXING AND SHEARING APPARATUS
Filed June 17, 1963   4 Sheets-Sheet 1
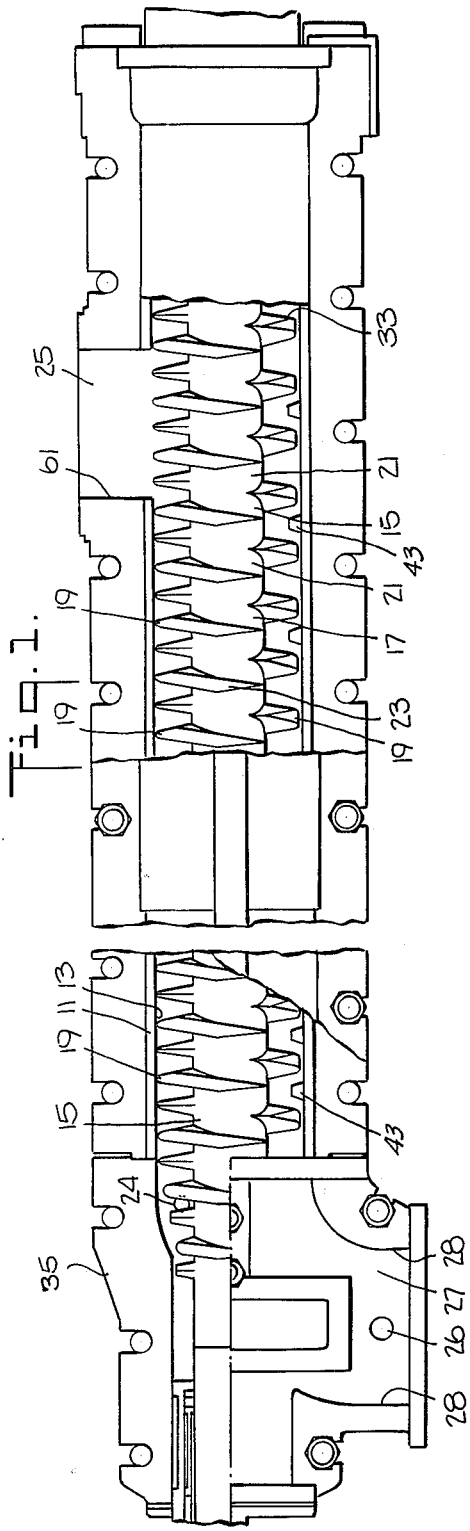
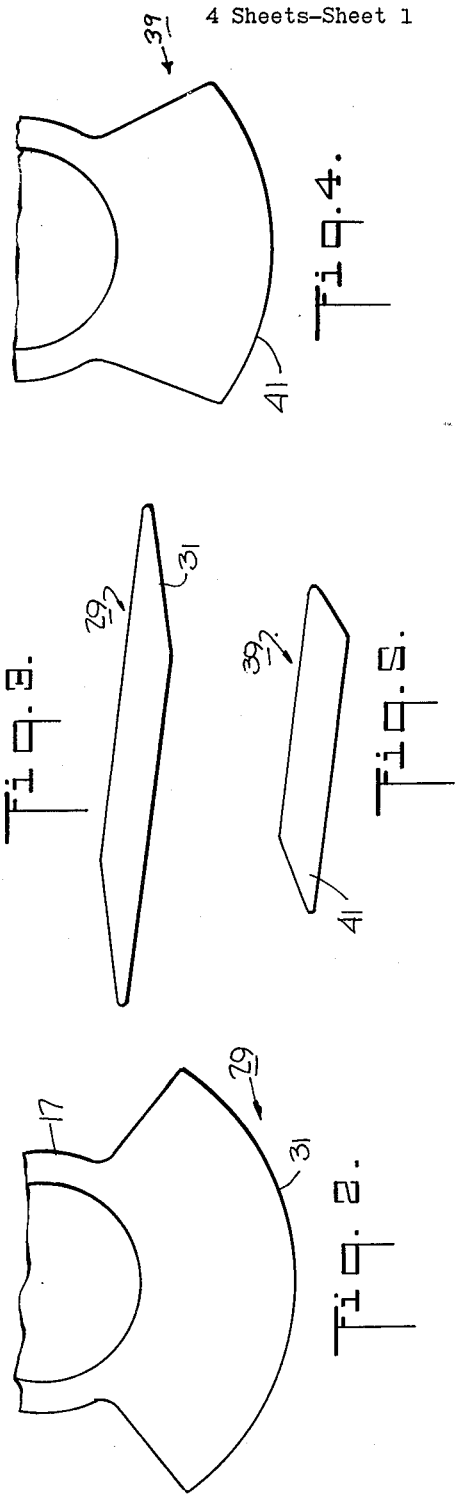

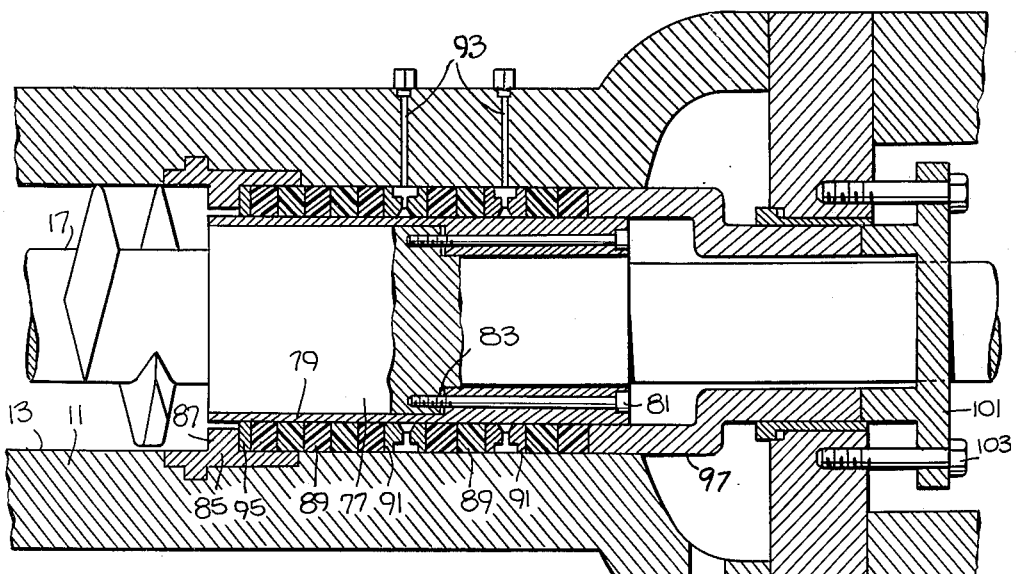
Fig. 5.
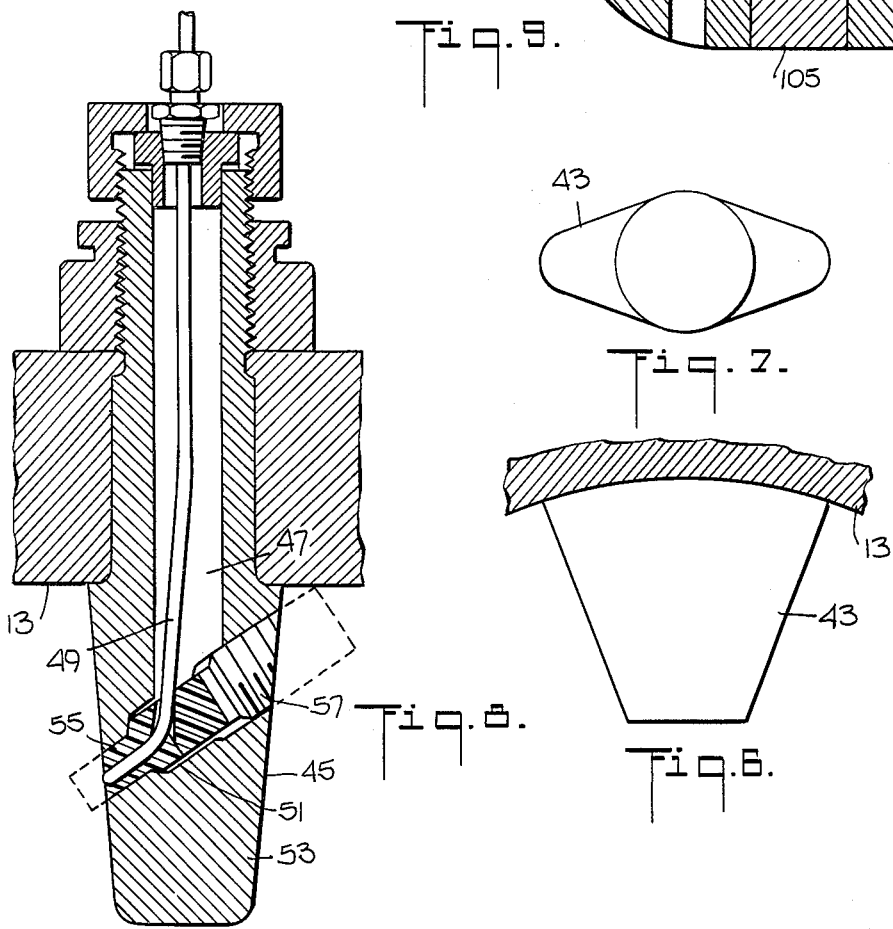
Fig. 7.
Fig. 8.
Fig. 6.

United States Patent Office 3,253,818
Patented May 31, 1966

3,253,818
MIXING AND SHEARING APPARATUS
Robert M. Seddon and Walter H. Russell, Kingsville, and Kenneth B. Rollins, Bishop, Tex., assignors to Celanese Corporation of America, New York, N.Y., a corporation of Delaware
Filed June 17, 1963, Ser. No. 288,240
26 Claims. (Cl. 259—9)

This invention relates to apparatus for use in the continuous mixing and shearing of material and more particularly to apparatus which is particularly useful in the mixing and shearing of polymerization mixtures.

In FIGURE 1 there is shown a partially broken away plan view of apparatus suitable for mixing and shearing material in accordance with one embodiment of this invention;

FIGURE 2 shows a plan view of a projection suitable for use with the apparatus of FIGURE 1 in accordance with one embodiment of this invention;

FIGURE 3 is a development view of the projection shown in FIGURE 2;

FIGURE 4 is a plan view of a projection suitable for use in the apparatus shown in FIGURE 1 in accordance with another embodiment of this invention;

FIGURE 5 is a development view of the projection shown in FIGURE 4;

FIGURE 6 is a side plan view of a tooth suitable for use in the apparatus of FIGURE 1 in accordance with one embodiment of this invention;

FIGURE 7 is a top plan view of the tooth shown in FIGURE 6;

FIGURE 8 is a sectional view of a tooth having a thermocouple positioned therein in accordance with one embodiment of this invention;

FIGURE 9 is a side view, partly in section, of a seal constructed in accordance with one embodiment of this invention.

Figure 10:
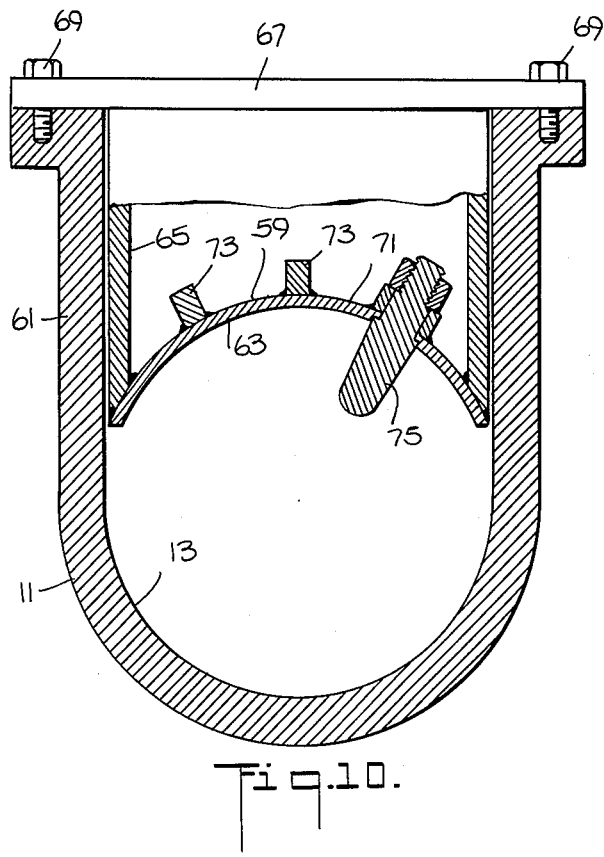
FIGURE 10 is a sectional view of the inlet portion of the apparatus shown in FIGURE 1 showing an inlet cover plate in accordance with one embodiment of this invention.
Figure 11:
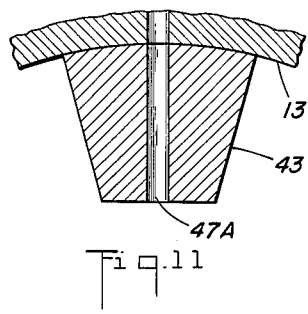
Figure 12:
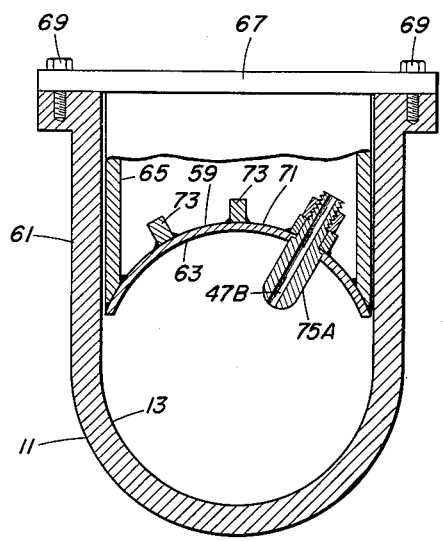

In FIGURE 11, a sectional view of one embodiment of a tooth 43 shown in the apparatus of FIGURE 1 is provided;

FIGURE 12 is the same as FIGURE 11 with the exception that another embodiment 75A of tooth 75 in FIGURE 10 is shown, this embodiment being a tooth 75A having a passageway 47B therein.

In FIGURE 1 there is shown a partially broken away plan view of apparatus in accordance with one embodiment of this invention. The apparatus includes a cylindrical barrel 11 having an inner surface 13, enclosing an interrupted-thread screw member 15 coaxial with the barrel 11. The barrel 11 encloses an elongated reaction zone. The screw 15 includes a shaft 17 having a plurality of spaced projections or flights 19 thereon, with interruptions 21 between the projections 19, which form, in effect, interrupted threads 23. The barrel 11 includes an inlet or feed end 33 and a discharge or outlet end 35. The barrel 11 has a number of rows of teeth 43 (see also FIGURES 6, 7 and 11) projecting from its inner surface 13. The screw 15 may be both rotatably and reciprocally moved with respect to the barrel 11 in such a manner that the teeth 43 projecting from the inner surface 13 of the barrel 11 pass between the projections on flights 19 on the screw 15 and thereby through the interruptions 21 in the threads 23 of the screw 15. A suitable arrangement for this purpose is shown in Patent No. 2,505,125 An inlet 25 having inlet walls 61 is positioned near the inlet end 33 of the apparatus and, in certain embodiments, is in the form of a hopper. Material which is to be treated or reacted in the apparatus is normally admitted through the inlet 25 although it may be desirable in certain instances to admit certain materials or portions of certain materials through other parts of the apparatus as will be described later.

After entering the apparatus the material being treated passes through the barrel 11 by virtue of the action of the interrupted-thread screw member 15 on the material. This action involves a vigorous shearing and mixing action and, when a normally solid reaction product is formed, the vigorous mixing and shearing prevents the formation of a solid mass which might interfere with the reaction or treatment, clog the apparatus, etc. After passing down the barrel 11 the treated material reaches an outlet 27 through which it passes for further treatment if necessary. In a particularly preferred embodiment the outlet 27 includes a downwardly curved outlet throat 28. The screw member 15 and the projections 19 may be hollow, if desired, so that a heating or cooling fluid may pass through in such a manner as to control the temperature of the material being treated. Also the barrel 11 itself may be constructed to provide for the passage of a heating or cooling fluid through the walls thereof to assist in the temperature control. It may be desirable in certain instances to have the barrel 11 and the screw 15 divided into a number of zones, each of which may be provided with a separate supply of fluid and separate temperature control mechanisms, such as thermostats, in order to give more accurate temperature control or, if desired, to provide different temperatures in different parts of the apparatus.

Embodiments of the projections 19 forming the interrupted threads 23 of the screw 15 are shown in FIGURES 2 through 5. In FIGURE 2 there is shown a sectional view of a comparatively wide projection or flight 29 having a curved outer surface 31 forming a circular arc between about 90° and about 130°, preferably 110°, with respect to a circle having a point on the axis of the shaft 17 of the screw 15 as its center. This comparatively wide projection 29 has the advantage that, if desired, the material, if in solid or semi-solid form, may be passed through the barrel 11 at a faster rate (higher pumping rate) than is the case with narrower projections. In FIG. 3 there is shown a development view of the curved outer surface 31 of the wide projection 29 shown in FIG. 2.

In a particularly preferred embodiment it has been found that the comparatively wide projections 29 are suitably positioned on the screw member 15 in the feed end 33 of barrel, and may extend from adjacent the area of the seal shown in FIG. 9 through the area of the inlet 25. The wide flights 29 provide a faster and better mixing action of the materials being treated, which, in this particular embodiment, are at least partially in liquid form.

In FIGURE 4 there is shown a narrower projection or flight 39 having a curved outer surface 41 providing a circular arc of between about 60° and about 75°, preferably about 65°, with respect to a circle having a point on the axis of the shaft 17 of the screw 15 as its center. The reduction in the width of the projection 39 has the result that the treated material passes through the barrel 11 at a slower rate (lower pumping rate) than would be the case if wider flights were used and provides a longer residence time for reaction without diminishing the rotatable or reciprocal speed of the apparatus which is desirable for adequate mixing of reactants and for the prevention of the formation of a solid mass of reaction product. If these projections are wider than about 75°, in some instances the apparatus would have to be made longer which would result in additional expense with no comparable benefit.

In a preferred embodiment there are three rows of teeth 43 and three projections 19 forming each interrupted thread 23. In portions of the reactor in which the comparatively wide projections 29 are present, the percent of the annular area (available to form threads) between the shaft 17 and the tip of projections 19 occupied by the three projections may vary between about 90% and about 96%, preferably about 96%, thus providing a comparatively high pumping rate for solid or semi-solid material, and a comparatively high mixing rate. When the narrower projections 39 are present the annular area occupied by these projections varies between about 50% and about 65%, preferably about 58.5%, thus providing a lower pumping rate and mixing rate than the portion of the apparatus having the wider projections 29. It should be pointed out that, in a preferred embodiment, the outer edges of the projections 19 are curved to form the arc of a circle, they may, if desired, be curved in a non-circular fashion, or shaped in a non-curved manner.

As shown in FIGURE 1, as the outlet 27 is approached, the barrel 11 decreases in diameter and thus the projections 19 from the shaft 17 of the screw member 15 correspondingly decrease in height.

In a preferred embodiment the shaft 17 extends across and past said outlet throat 28 with projections 19 from the shaft 17 being positioned along the shaft 17 to a location well within the outlet area (preferably across at least 50% of the length of the outlet 27 measured along the shaft 17) to assist in passing the material out through the outlet 27.

In FIGURES 6 and 7 there are shown teeth 43 which project from the inner surface 13 of the barrel 11. These teeth 43 are not shown in FIGURE 1 for the sake of simplicity but they project from the inner surface 13 of the barrel 11 in such a way that when the screw member 15 is rotatably and reciprocally operated, the teeth 43 pass through the interruptions 21 between the projections 19. In a preferred embodiment the teeth 43 occur in rows along the inner surface 13 of the barrel 11 and extend into the outlet area in order to assist, in corporation with the reduced height projections 19, in the ejection of the treated material. Of course the teeth 43 will have reduced height corresponding to the reduction in diameter of the barrel 11 as the outlet 21 is approached.

In a preferred embodiment the outlet or discharge 27 comprises a downwardly opening outlet or discharge throat 28 which may include a plurality of inwardly projecting teeth 43.

In a particularly preferred embodiment there are twenty-eight evenly spaced teeth 43 in each of 3 evenly spaced rows projecting from the inner surface 13 of the barrel 11. The twenty-eight teeth include those which extend into the area of the outlet 27.

In order to assist in temperature control, temperature sensing devices, such as thermocouples, may be positioned within the apparatus at various points in order to determine the temperature at these points. In a preferred embodiment the temperature sensing devices may be positioned in appropriately located teeth 45 projecting from the inner surface of the cylinder as shown in FIGURE 8. In FIGURE 8 there is shown a tooth 45 projecting from the inner barrel surface 13 having a recessed center portion 47 through which a thermocouple 49 extends. A passageway 51 extends through the tooth 45 in such a manner as to intersect with the bottom part of the recessed center portion 47. The passageway 51 may be at an angle (preferably between about 30° and about 60°) with the axis of the tooth 45 as desired. The thermocouple 49 passes through the recessed center portion 47 and then through a part of the passageway 51 to the outer surface 53 of the tooth 45. The end of the thermocouple 49 is flush with the outer surface 53 of the tooth 45 and may be held in position by a sleeve 55 made of a suitable inert material such as polytetrafluoroethylene. The sleeve 55 may be held in place by a threaded screw member 57 which, after being tightened, is cut off and seam sealed flush with the outer surface 53 of the tooth 45. With the end of the thermocouple 49 being positioned flush with the outer surface 53 of the tooth 45, very accurate temperature readings may be obtained and the appropriate temperature gradient may be provided. The number and position of the thermocouples 49 may vary in accordance with the accuracy of the temperature gradient desired.

While the above described apparatus may be useful in many mixing and/or material reacting uses it is particularly suitable in the formation of trioxane polymers and will be described with respect thereto although the invention should not be so limited.

It is known that trioxane may be homopolymerized or copolymerized to produce tough, thermally stable, moldable polymers. When polymerization of liquid phase trioxane takes place in the presence of a suitable catalyst, conversion to the polymer is substantially complete and the polymer forms as a solid mass filling the entire volume of the reactor. In order to further process the polymer, the polymer mass must be ground, chopped or pulverized which is costly and many times is commercially impractical in view of the extreme toughness of the polymer. Also temperature control in the solidified polymer mix is very difficult. These problems may be avoided when the polymerization mixture is diluted with a large amount of an inert solvent which prevents solidification of the reactant mass. However, it is often preferably for higher molecular weight products or for more rapid reaction rates to polymerize reaction mixtures containing little or no solvent.

In a preferred embodiment the apparatus of this invention may be used for the polymerization of trioxane in a polymerization mixture containing at least 50 weight percent of trioxane.

In a particularly preferred embodiment the apparatus is used in a process for the polymerization of trioxane which comprises preparing a liquid phase polymerization mixture containing at least 50 weight percent of trioxane and also containing a polymerization catalyst therefor, maintaining the mixture in the apparatus for a period sufficient to convert sufficient trioxane to polymeric form so that a solidified mass would be formed in the absence of the vigorous mixing and shearing action provided by the apparatus of this invention, exerting on the polymerization mixture a vigorous mixing and shearing action throughout the polymerization process and, in a preferred embodiment, blending at least a portion of the polymerization mixture with another portion of the polymerization mixture which has a lower polymer content.

Of course, to maintain continuous mixing and shearing action as the solid state polymer is formed, sufficient power must be applied to the mixing and shearing elements of the apparatus to avoid their becoming frozen or immobilized.

While a large number of polymerization catalysts for trioxane are suitable, the preferred polymerization catalysts are those containing boron fluoride. Suitable catalysts include boron fluoride, described in U.S. Patent No. 2,989,507 of Hudgin and Berardinelli; boron fluoride coordinate complexes with organic compounds in which oxygen or sulfur is the donor atoms, described in U.S. Patent No. 2,989,506 of Hudgin and Berardinelli; boron fluoride coordinate complexes with water, described in application S.N. 67,918, filed November 8, 1960, now Patent No. 3,200,096 by Hudgin and Berardinelli; and boron fluoride coordinate complexes with basic trivalent nitrogen or phosphorus compounds having ionization constants in water at 25° C. not higher than about $1 \times 10^{-9}$, described in U.S. Patent No. 2,989,511 of Schnizer. Boron fluoride-ether complexes, such as boron fluoride dibutyl etherate are especially preferred.

The catalyst is usually admixed with the trioxane in amounts between about 0.0001 and about 0.10 weight percent, based on its boron fluoride content. Preferably, amounts between about 0.0005 and about 0.025 weight percent are used.

Other catalysts are disclosed in an article by Kern et al. in Angewandte Chemie 73 (6), pages 177 to 186 (March 21, 1961).

Particular polymers which may be utilized in this invention include those copolymers having at least one chain containing oxymethylene units (usually at least 85 mol percent) interspersed with —O—R— units wherein R is a divalent radical containing at least two carbon atoms directly linked to each other and positioned in the chain between the two valences, with any substituent in the R radical being inert. Preferably such substituents include hydrocarbons or halohydrocarbons which are inert with respect to formaldehyde under the conditions of polymerization.

As used in this application, the term "oxymethylene" includes substituted oxymethylene, where the substituents are inert with respect to the reaction in question, that is, the substituents are free of interfering functional groups and will not induce undesirable reactions.

Specifically trioxane may be blended with one or more comonomers and particularly a cyclic ether having adjacent carbon atoms as disclosed in U.S. Patent No. 3,027,352, Walling et al. A particularly preferred class of comonomers are those cyclic ethers having the structure

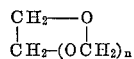

where $n$ is an integer from zero to two.

Among the specific cyclic ethers which may be used are ethylene oxide; 1,3 dioxolane; 1,3,5 trioxepane; 1,3 dioxane; trimethylene oxide; pentamethylene oxide; 1,2 propylene oxide, 1,2 butylene oxide; neopentyl formal; paraldehyde; tetrahydrofuran and butadiene monoxide.

These and other materials may be used with trioxane to form copolymers including terpolymers and higher polymers. For example, the above class of cyclic ethers may be used with polyepoxides and similar materials to form terpolymers as disclosed in U.S. patent application S.N. 229,715, filed October 10, 1962 by W. E. Heinz et al., which application is assigned to the same assignee as the subject application.

The copolymers may also incorporate other interspersed monomeric units derived from lactones, carbonates, cyclic acid hydrates or ethylenically unsaturated compounds such as styrene, diformal ether, vinyl acetate, vinyl methyl ketone or acrolein as disclosed in the above mentioned Kern et al article. The polymers may be end-capped by acylation or esterification after polymerization or during polymerization by the use of selected chain transfer agents. This information is also disclosed in the Kern et al. article.

In forming copolymers, the comonomer is usually used in amounts of at least 0.1 weight percent, preferably between about 0.1 and about 20 weight percent, based on the weight of trioxane and most preferably in amounts between about 0.1 and about 10 weight percent.

Small amounts of solvents may be used in the process of this invention provided that the reaction mixture contains at least 50 weight percent of trioxane. Among the suitable solvents which may be used are cyclohexane, benzene, ethylene dichloride, pentane, trichloroethylene, ligroin (90–100° C. B.P.), carbon tetrachloride, octane, symmetrical tetrachloroethane, diethyl ether, petroleum ether (30–60° C. B.P.) and methylene chloride.

The reactant mixture is introduced into the apparatus near the feed end 33 of the cylindrical barrel 11 and, if desired, through the inlet 25. In a particularly preferred embodiment the inlet 25 is covered with a cover plate 59 as shown in FIGURE 10. The walls 61 of the inlet 25 extend through the barrel 11 and may project above the upper surface of the barrel 11 if desired. A cover plate 59 having a bottom member 71 with an arcuate bottom surface 63 is inserted into the opening of the inlet 25. The curvature of the bottom surface 63 is similar to that of the inner surface 13 of the barrel 11 so that the cover plate bottom surface 63 acts as a continuation of the adjacent portion of the barrel inner surface 13. The cover plate 59 includes side walls 65 and a top member 67 which may extend beyond the inlet opening and may be fastened to the barrel 11 by screws 69 or other suitable fastening means. The bottom 71 of the cover plate 59 may include rib members 73 for strengthening and may also include a plurality of teeth 75 projecting from the bottom surface 63 of the cover plate 59 in a manner similar to the projection of the teeth 43 from the inner surface 13 of the barrel 11. Certain of these teeth 75 may contain small passageways through which ingredients in the reaction mixture may pass.

Thus, in this particular embodiment, the barrel 11 is, in effect, continuously enclosed as the feed end 33 with, in effect, no inlet hopper and no sizable inlet opening, with the inner surface 13 of the barrel 11 being continuous, in effect. The small passageways in the teeth 43 and 75 do not affect the continuous enclosure or the unbroken inner surface 13 of the barrel 11.

In one preferred embodiment trioxane; a cyclic ether such as 1,3 dioxolane or ethylene oxide; a solvent such as cyclohexane; and a chain transfer agent such as methanol or methylal may be fed separately or as mixtures of one or more components, through the passageways 47B of the teeth 75A (see FIGURE 12) of the inlet cover plate 59 or through passageways 47A (see FIGURE 11) in one or more of the teeth 43 located adjacent to the inlet 25. In some instances, it may be desirable to feed the catalyst through a separate passageway in one of the teeth in order to avoid premature polymerization.

The polymerization mass is preferably maintained at a temperature between about 0° and about 116° C. after initiation at temperatures above about 60° C. Rotation and reciprocation of the screw 15 maintain a vigorous mixing and shearing action on the reaction mixture and prevent the formation of a solid mass. The reaction mixture changes from a free flowing clear liquid through a progressively thicker slurry and finally to a dry solid in a very short period of time. It is discharged as a solid product consisting largely of polymer. This material is easily handled for washing and further treatment and processing, if desired. The reaction time in the cylinder is preferably from about 0.5 to about 10 minutes and most preferably from about 0.5 to about 2 minutes.

As the polymerization mixture is conveyed from the charging or feed end 33 to the discharge end 35 of the elongated reaction zone, a portion of the mixture is conveyed from a position farther removed from the feed end 33 to a position closer to the feed end 33, thereby achieving controlled "back-mixing" or the blending of a first portion of the polymerization mixture having a higher polymer content with a second portion of the polymerization mixture having a lower polymer content.

On occasion it may be desirable to pass the ingredients through concentric passageways in a tooth 43. For example, the catalyst, particularly in gaseous form, may be fed through a center tube with the other ingredients, particularly when they are in liquid form, being fed in a concentric tub surrounding the inner tube. When these materials are injected at a comparatively high velocity excellent mixing occurs at the inlet end of the tooth 43. In certain instances the mixing provided in such an arrangement is of material benefit in providing pre-mixed ingredients which then may be further mixed in the apparatus described.

As described in U.S. patent application Serial No. 230,645, filed October 15, 1962 by Gene J. Fisher et al., a layer of hard polymer is built up on the respective surfaces of the barrel 11 and screw 13 which do not come into direct wiping contact with each other during their movements during the polymerization reaction. This polymer layer is due to the deposition of the polymer formed on the internal portions of the apparatus during the reaction. If there is no wiping contact between the parts of the polymer layer tends to adhere to the apparatus and becomes very hard. The tip portions of the projections 19 are not normally coated because they are in wiping contact with the coated inner surface 13 of the barrel 11. Also the tips of the teeth 43 are not coated because they are in wiping contact with coated portions of the shaft 17.

Because of the presence of the coated layer the total area of wiping contact between portions of the barrel 11 and portions of the screw 15 is greatly increased, and the flow of material which by-passes the relatively movable parts is therefore restricted. This aids in maintaining a body of liquid monomer-containing material within the reactor adjacent the inlet or feed end 33 of the reactor and also helps prevent leakage of liquid around the seal at the inlet end. To construct a practical reactor of metal having the same dimensions and clearances as characterize the resulting "coated" reactor would be difficult, if not impossible, since on thermal expansion or contraction the contacting metal parts would tend to bind, and since the contacting, relatively movable metal parts would tend to wear, increasing the clearances between such parts. In contrast the "coated" reactor tends to be self-healing; in that there is continuous redeposition of portions of the polymer coating that may be worn off by wiping against an adjacent coated or uncoated metal part.

It may be desirable in some instances to reduce the height of the teeth 43 by between about 10 and about 50%. This has the effect of reducing the effective height of the projections 19 because the polymer coating is permitted to build up on the shaft 17 which has the effect of increasing the diameter of the shaft 17, and reducing the open cross-sectional area of the reactor and the height which the projections 19 project above the effective shaft 17. With this configuration, the solid products of the reaction tend to have a longer residence time in the reactor.

It may be desirable to treat the reactor product with a catalyst deactivation agent before the polymer leaves the reactor. This is done to prevent the formation of polymer after the treated material has left the reactor, which would tend to form polymer coatings on apparatus through which the product passes after leaving the reactor. In a preferred embodiment, catalyst deactivation agent or "quench" inlets 24 and 26 are positioned near the discharge end of the reactor. In this embodiment the upper quench inlet 24 has an identical counterpart opposite in location on the cutaway portion of the reactor; with only one lower quench inlet 26.

The quench material may be water or an aliphatic amine such as Tri-n-butylamine or triethylamine, which amine should be in stoichiometric excess over the amount of free catalyst in the reaction product. Preferably the amine should be in an organic wash liquid which is a solvent for unreacted trioxane. A detailed description of suitable quench materials and methods may be found in U.S. Patent No. 2,989,509 by Donald E. Hudgin and Frank M. Berardinelli, assigned to the same assignee as the subject application.

In order to prevent the reaction mixture or ingredients thereof from leaking out the inlet end 33 of the apparatus a special seal has been incorporated therein. It has been found that prior art seals many times permitted the passage of liquid through the seal. This was not necessarily harmful as the liquid could be removed by the use of a sump and either discarded or recycled if the amounts were sufficiently large. However, in a polymerization process it is possible for liquid reaction materials to pass through the seal and subsequently polymerize to form a hard solid polymer which could clog the sump and otherwise interfere with the proper operation of the apparatus.

A particularly effective seal is shown in FIGURE 9. The diameter of the shaft 17 is enlarged to somewhat less than the internal diameter of the cylindrical barrel 11. The outer surface of this larger shaft portion 77 is provided with a suitable long-wearing surface. In a preferred embodiment this is done by providing a cylindrical sleeve 79 of a suitably long wearing inert material such as chromium-plated A.I.S.I. #316 stainless steel. This cylindrical sleeve 79 may be held in place by screws 81 which fasten the sleeve 79 to the shaft 77. A gasket 83 made from a suitable inert material such as polytetrafluoroethylene may be used between the sleeve 79 and the shaft 77 in order to provide a tight fit when the screws 81 are tightened. A packing retainer 85 is inserted into the surface of the cylindrical barrel 11 and has an inwardly projecting portion, which may be in the form of a rib 87, which keeps the actual seal packing 89 in position. This retainer 85 should be made of an inert material such as chromium-plated A.I.S.I. #316 stainless steel. Suitably long-wearing low friction seal packing material 89, such as polytetrafluoroethylene, is positioned between the other surface of the shaft 77, which surface is formed by sleeve 79, and the inner surface 13 of the barrel 11 in such a fashion as to form a seal which prevents the leakage of a liquid material. Lantern rings 91 made of a material such as stainless steel are connected to grease channels 93 and may be lubricated with a material such as silicone greases to provide satisfactory low friction operation, being inert with respect to the reactants and products to which they are exposed. A packing ring 95 is inserted between the packing 89 and the projection 87 on the barrel liner and may be made of an inert material such as #316 stainless steel. A pressure ring 97 made of a material such as bronze is positioned so that it presses against the polytetrafluoroethylene packing material 89 in order to give a sufficiently tight seal.

In a particular embodiment shown in FIGURE 9 the bronze pressure ring 97 has a diameter of approximately 12" at one end and approximately 6" at the other end and is operable to exert pressure by suitable tightening means such as screws 103 which are attached to the housing 105 and which may be suitably tightened to exert pressure on the packing 89. The pressure tightening ring 101 may be made of a suitable material such as A.I.S.I. #316 stainless steel.

In a preferred embodiment, the cylindrical barrel 11 is built in two sections which may be split on a vertical center line. Each half may be hinged for easy access and cleaning of the interior. Both sections may be opened and closed by hydraulic cylinders (not shown) with the pressure supplied by a manually operated hydraulic power unit or other suitable means.

The inlet 25 may be referred to as a feed inlet or feed portion and when there is no specific large inlet 25, but the barrel 11 continuously enclosed the feed end 33, the feed portion refers to the portion of the barrel 11 into which the materials to be treated are introduced through the small passageways in the barrel 11 or in the various teeth as described previously.

It is to be understood that the foregoing detailed description is given merely by way of illustration and that many variations may be made therein without departing from the spirit of our invention.

The embodiments of the invention in which an exclusive property or privilege is claimed are defined as follows:

1. Apparatus for continuously imparting a vigorous mixing and shearing action for a material, said apparatus comprising a cylindrical barrel having internal surfaces,
a screw member coaxial with said barrel, positioned within said barrel and having a plurality of interrupted threads,
said interrupted threads comprising a plurality of projections,
said barrel having a plurality of teeth projecting inwardly from said internal surfaces,
said screw member and said barrel being relatively movable in both a rotatable and an axially reciprocal manner so that said teeth are operable to pass between said projections through the interruptions in said threads,
at least one of said teeth having an opening in its surface and having a temperature sensing device positioned therein so that said temperature sensing device is directly exposed to the material being treated in said apparatus through said opening.

2. The apparatus of claim 1 wherein said temperature sensing device is a thermocouple positioned within said tooth so that the tip of said thermocouple is positioned in said opening flush with the surface of said tooth.

3. Apparatus for continuously imparting a vigorous mixing and shearing action for a material, said apparatus comprising a cylindrical barrel having internal surfaces,
a screw member coaxial with said barrel, positioned within said barrel and having a plurality of interrupted threads,
said interrupted threads comprising a plurality of projections,
said barrel having a plurality of teeth projecting inwardly from said internal surfaces,
said screw member and said barrel being relatively movable in both a rotatable and an axially reciprocal manner so that said teeth are operable to pass between said projections through the interruptions in said threads,
at least one of said teeth having a passageway therein suitable for the injection of at least part of said material.

4. Apparatus for continuously imparting a vigorous mixing and shearing action for a material, said apparatus comprising a cylindrical barrel having internal surfaces,
a screw member coaxial with said barrel, positioned within said barrel and having a plurality of interrupted threads,
said interrupted threads comprising a plurality of projections,
said barrel having a plurality of teeth projecting inwardly from said internal surfaces,
said screw member and said barrel being relatively movable in both a rotatable and an axially reciprocal manner so that said teeth are operable to pass between said projections through the interruptions in said threads,
said barrel having an inlet therein,
a cover plate positioned in said inlet,
said cover plate having an inner surface and a plurality of teeth projecting inwardly from said inner surface.

5. The apparatus of claim 4 wherein said cover plate inner surface has an arcuate configuration such that said cover plate surface acts as a continuation of said cylindrical barrel internal surface.

6. The apparatus of claim 4 wherein
at least one of said cover plate teeth has a passageway therein suitable for the injection of at least part of said material.

7. The apparatus of claim 4 wherein at least one of said barrel teeth and at least one of said cover plate teeth have passageway therein suitable for the injection of at least part of said material.

8. The apparatus of claim 4 wherein at least one of said barrel teeth has a passageway therein suitable for the injection of at least part of said material.

9. Apparatus for continuously imparting a vigorous mixing and shearing action to a polymerization mixture comprising
(1) at least 50 weight percent of trioxane, and
(2) a polymerization catalyst therefor,
said apparatus comprising
a cylindrical barrel having internal surfaces,
a screw member coaxial with said barrel, positioned within said barrel and having a plurality of interrupted threads,
said interrupted threads comprising a plurality of projections,
said barrel having a plurality of teeth projecting inwardly from said internal surfaces,
said screw member and said barrel being relatively movable in both a rotatable and an axially reciprocal manner so that said teeth are operable to pass between said projections through the interruptions in said threads,
at least one of said teeth having a passageway therein suitable for the injection of at least part of the ingredients of said polymerization mixture.

10. Apparatus for continuously imparting a vigorous mixing and shearing action to a polymerization mixture comprising
(1) at least 50 weight percent of trioxane, and
(2) a polymerization catalyst therefor,
said apparatus comprising
a cyclindrical barrel having internal surfaces,
a screw member coaxial with said barrel, positioned within said barrel and having a plurality of interrupted threads,
said interrupted threads comprising a plurality of projections,
said barrel having a plurality of teeth projecting inwardly from said internal surfaces,
said screw member and said barrel being relatively movable in both a rotatable and an axially reciprocal manner so that said teeth are operable to pass between said projections through the interruptions in said threads,
said barrel having an inlet therein,
a cover plate positioned in said inlet,
said cover plate having an inner surface and a plurality of teeth projecting inwardly from said inner surface,
at least one of said barrel teeth and at least one of said cover plate teeth have passageways therein suitable for the injection of at least part of the ingredients of said polymerization mixture,
at least one of said barrel teeth having a passageway therein suitable for the injection of said polymerization catalyst.

11. Apparatus for continuously imparting a vigorous mixing and shearing action to material, said apparatus comprises,
a cylindrical barrel having internal surfaces,
a screw member coaxial with said barrel and positioned within said barrel,
said barrel having a plurality of teeth projecting inwardly from said internal surfaces,
said screw member having a plurality of interrupted threads projecting from a shaft member,
said interrupted threads comprising a plurality of first projections and a plurality of second projections,
said first and second projections having curved outer edges,
at least one of said first projections and at least one of said second projections having their curved outer edges forming an arc of a circle having a point on the axis of said screw member as the center of said circle, said arc of said first projection outer edge being from about 90° to about 130°, the arc of said second projection outer edge being from about 60° to about 75°.

12. The apparatus of claim 11 wherein the portion of said apparatus having said first projections has a higher pumping rate than the portion of said apparatus having said second projections.

13. The apparatus of claim 11 wherein the portion of said apparatus having said first projections has a higher mixing rate than the portion of said apparatus having said second projections.

14. Apparatus for continuously imparting a vigorous mixing and shearing action to a material, said apparatus comprises,
   a cylindrical barrel having internal surfaces,
   a screw member coaxial with said barrel and positioned within said barrel,
   said barrel having a plurality of teeth projecting inwardly from said internal surfaces,
   said screw member having a plurality of interrupted threads projecting from a shaft member,
   said interrupted threads comprising a plurality of first projections and a plurality of second projections,
   said first and second projections having curved outer edges,
   at least one of said first projections and at least one of said second projections having their curved outer edges forming an arc of a circle having a point on the axis of said screw member as the center of said circle,
   the percent of the annular area between said shaft member and said outer edge of said first projection occupied by said first projections in a first projection interrupted thread is between about 90% and about 96%,
   the percent of the annular area between said shaft member and said outer edge of said second projection occupied by said second projections in a second projection interrupted thread is between about 50% and about 65%.

15. The apparatus of claim 14 wherein the portion of said apparatus having said first projections has a higher pumping rate than the portion of said apparatus having said second projections.

16. The apparatus of claim 14 wherein the portion of said apparatus having said first projections has a higher mixing rate than the portion of said apparatus having said second projections.

17. The apparatus of claim 11 wherein said barrel has a feed end and a feed portion adjacent said feed end,
   said barrel having a discharge end,
   at least one of said first projections being positioned between said feed portion and said discharge end,
   at least one of said second projections being positioned between said feed portion and said feed end.

18. Apparatus for continuously imparting a vigorous mixing and shearing action to a polymerization mixture comprising
   (1) at least 50 weight percent of trioxane,
   (2) at least 0.1 weight percent of a cyclic ether having adjacent carbon atoms, and
   (3) a polymerization catalyst therefor,
said apparatus comprising
   a cylindrical barrel having internal surfaces,
   a screw member coaxial with said barrel, positioned within said barrel and having a plurality of interrupted threads projecting from a shaft member,
   said interrupted threads comprising a plurality of first projections and a plurality of second projections,
   said first and second projections having curved outer edges,
   at least one of said first projections and at least one of said second projections having their curved outer edges forming an arc of a circle having a point on the axis of said screw member as the center of said circle,
   said arc of said first projection outer edge being from about 90° to about 130°,
   the arc of said second projection outer edge being from about 60° to about 75°,
   said barrel having a feed end and a feed portion adjacent said feed end,
   said barrel having a discharge end,
   at least one of said first projections being positioned between said feed portion and said feed end,
   at least one of said second projections being positioned between said feed portion and said discharge end,
   said barrel having a plurality of teeth projecting inwardly from said internal surfaces,
   said screw member and said barrel being relatively movable in both a rotatable and an axially reciprocal manner so that said barrel teeth are operable to pass between said projections through the interruptions in said threads,
   at least one of said barrel teeth having an opening in its surface and having a thermocouple positioned within said tooth so that the tip of said thermocouple is positioned in said opening flush with the surface of said tooth,
   a cover plate positioned in said inlet,
   said cover plate having an inner surface and a plurality of teeth projecting inwardly from said inner surface,
   said cover plate inner surface having an arcuate configuration such that said cover plate inner surface acts as a continuation of said cylindrical barrel internal surface,
   at least one of said barrel teeth and at least one of said cover plate teeth having passageways therein suitable for the injection of at least part of the ingredients of said polymerization mixture,
   the projections positioned with the portion of said barrel having said gradually decreasing diameter having gradually decreasing height as said projections are positioned further from said feed end,
   said barrel having downwardly opening discharge throat at said discharge end,
   said discharge throat having a plurality of inwardly projecting teeth,
   said shaft member extending across and past said discharge throat,
   at least about 50% of the portion of said shaft member which extends across said discharge throat having projections thereon, and
   at least one catalyst deactivation agent inlet adjacent said discharge end.

19. Apparatus for continuously imparting a vigorous mixing and shearing action to a polymerization mixture comprising
   (1) at least 50 weight percent of trioxane, and
   (2) a polymerization catalyst therefor,
said apparatus comprising
   a cylindrical barrel having internal surfaces,
   a screw member coaxial with said barrel, positioned within said barrel and having a plurality of interrupted threads,
   said interrupted threads comprising a plurality of projections,
   said barrel having a plurality of teeth projecting inwardly from said internal surfaces,
   said screw member and said barrel being relatively movable in both a rotatable and an axially reciprocal manner so that said teeth are operable to pass between said projections through the interruptions in said threads,
   at least one of said teeth having a plurality of concentric passageways therein suitable for the injection of at least part of the ingredients of said polymerization mixture.

20. Apparatus for continuously imparting a vigorous mixing and shearing action for a material, said apparatus comprising
   a cylindrical barrel having internal surfaces,
   a screw member coaxial with said barrel, positioned within said barrel and having a plurality of interrupted threads,
   said interrupted threads comprising a plurality of projections,
   said barrel having a plurality of teeth projecting inwardly from said internal surfaces,
   said screw member and said barrel being relatively movable in both a rotatable and an axially reciprocal manner so that said teeth are operable to pass between said projections through the interruptions in said threads,
   said barrel having a feed end and a discharge end,
   said barrel having a gradually decreasing diameter at said discharge end,
   wherein the projections positioned within the portion of said barrel having said gradually decreasing diameter have a gradually decreasing height as said projections are positioned further from said feed end.

21. Apparatus for continuously imparting a vigorous mixing and shearing action for a material, said apparatus comprising
   a cylindrical barrel having internal surfaces,
   a screw member coaxial with said barrel, positioned within said barrel and having a plurality of interrupted threads,
   said interrupted threads comprising a plurality of projections,
   said barrel having a plurality of teeth projecting inwardly from said internal surfaces,
   said screw member and said barrel being relatively movable in both a rotatable and an axially reciprocal manner so that said teeth are operable to pass between said projections through the interruptions in said threads,
   said barrel having a feed end and a discharge end,
   said barrel having a downwardly opening discharge throat at said discharge end,
   wherein said outlet throat has a plurality of inwardly projecting teeth,
   said shaft member extending across and past said discharge throat,
   at least about 50% of the portion of said shaft member which extends across said discharge throat having projections thereon.

22. The apparatus of claim 11, said barrel having a feed end and a discharge end, said barrel having a gradually decreasing diameter at said discharge end.

23. The apparatus of claim 11, said barrel having a feed end and a discharge end, said barrel having a gradually decreasing diameter at said discharge, the projections positioned within the portion of said barrel having said gradually decreasing diameter having a gradually decreasing height as said projections are positioned further from said feed end.

24. The apparatus of claim 11, said barrel having a feed end and a discharge end, and said barrel having a downwardly opening discharge throat at said discharge end.

25. The apparatus of claim 11, said barrel having a feed end and a discharge end, and at least one catalyst deactivation agent inlet adjacent said discharge end.

26. The apparatus of claim 11, said barrel having a continuously enclosed feed end and a discharge end.

References Cited by the Examiner

UNITED STATES PATENTS

| | | | |
|---|---|---|---|
| 2,731,247 | 1/1956 | Hundry | 18—12 |
| 2,768,994 | 10/1956 | MacDonald | 260—67 |
| 3,023,455 | 3/1962 | Geier et al. | 259—9 |
| 3,102,694 | 9/1963 | Frenkel | 259—9 |
| 3,103,499 | 9/1963 | Dolce et al. | 260—67 |
| 3,118,859 | 1/1964 | Delassus et al. | 260—67 |

OTHER REFERENCES

Derwent Belgian Patents Report, No. 92B, 1962, page 6.

WALTER A. SCHEEL, *Primary Examiner.*
CHARLES A. WILLMUTH, *Examiner.*
ROBERT W. JENKINS, *Assistant Examiner.*